(12) United States Patent
Kuroshima

(10) Patent No.: US 6,486,993 B1
(45) Date of Patent: Nov. 26, 2002

(54) WAVELENGTH DISPERSION COMPENSATION APPARATUS IN WAVELENGTH MULTIPLEX TRANSMISSION SYSTEM

(75) Inventor: Jun Kuroshima, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/275,635

(22) Filed: Mar. 24, 1999

(30) Foreign Application Priority Data

Mar. 30, 1998 (JP) .......................................... 10-084668

(51) Int. Cl.$^7$ .............................................. H04B 10/00
(52) U.S. Cl. ....................... 359/161; 359/130; 359/124; 385/37; 385/123
(58) Field of Search ................................ 359/124, 127, 359/130, 161, 173; 385/24, 37, 123

(56) References Cited

U.S. PATENT DOCUMENTS

| | | | | |
|---|---|---|---|---|
| 6,137,604 A | * | 10/2000 | Bergano | 359/124 |
| 6,181,449 B1 | * | 1/2001 | Taga et al. | 359/124 |
| 6,292,603 B1 | * | 9/2001 | Mizuochi et al. | 385/24 |

FOREIGN PATENT DOCUMENTS

| | | |
|---|---|---|
| EP | 0732819 | 9/1996 |
| JP | 7-107069 | 4/1995 |
| JP | 8-307347 | 11/1996 |
| JP | 9-46318 | 2/1997 |
| JP | 9-116493 | 5/1997 |
| JP | 9-191290 | 7/1997 |
| JP | 9-326759 | 12/1997 |
| JP | 10-145298 | 5/1998 |
| JP | 10-242943 | 9/1998 |
| JP | 11-150527 | 6/1999 |

OTHER PUBLICATIONS

Japanese Office Action issued Jun. 13, 2000 in a related application with English translation of relevant portions.

* cited by examiner

Primary Examiner—Kinfe-Michael Negash
(74) Attorney, Agent, or Firm—Dickstein, Shapiro, Morin & Oshinsky, LLP.

(57) ABSTRACT

A wavelength dispersion compensation apparatus is provided which requires only a small number of dispersion compensation fibers for compensating for the wavelength dispersion of a wavelength multiplex signal caused in the transmission optical fibers.

The dispersion compensation fibers are used for transmitting individual light signals which composes a wavelength multiplex signal, in order to give a wavelength dispersion in the opposite direction, the absolute value of which is the same as the dispersion which will be caused in the light signals during transmitting in the transmission optical fibers. At the output ends of the dispersion compensation fibers, a pair of two light signals with specific wavelengths is extracted by the light branching means composed of fiber gratings FG11 and FG12 and so on. The light signals extracted by the light branching means are multiplexed by the arrayed waveguide AWG2 and supplied to the transmission optical fibers after amplified by the light amplifiers AMP1 to AMP8.

5 Claims, 2 Drawing Sheets

WAVELENGTH DISPERSION COMPENSATION APPARATUS IN WAVELENGTH MULTIPLEX TRANSMISSION SYSTEM

BACKGROUND OF THE INVENTION

1. Field of the Invention

This invention relates to a wavelength dispersion compensation apparatus for compensating for wavelength dispersion occurring in light signals during transmission through optical fibers, and particularly relates to a wavelength dispersion compensation apparatus for a wavelength multiplex transmission system.

2. Background Art

An optical fiber for transmitting light signals possesses the property that the transmission times of light signals differ depending upon the wavelength of the light signal. Thus, in the case when a light signal is transmitted through optical fibers, the signal waveform is likely to spread depending upon the transmission distance. This phenomenon is called the "wavelength dispersion".

Optical fibers possess a characteristic wavelength called zero-dispersion wavelength. If the wavelength of a light signal conforms with the zero dispersion wavelength, wavelength dispersion will not occur irrespective of the transmission length. Therefore, when a light signal with a single wavelength is transmitted, it is possible to prevent degradation of the S/N ratio by conforming the wavelength of the light signal with the zero-dispersion wavelength of the optical fiber.

However, if the wavelength of the light signal does not conform with the zero dispersion wavelength of the optical fiber used for transmission of the light signal, measures must be taken to compensate the wavelength dispersion which occurs during the transmission of the light signal. In order to compensate for wavelength dispersion, a measure is generally taken, in which, a particular dispersion compensating fiber is provided which generates a reverse wavelength dispersion of the light signal, and the light signal is first passed through the particular dispersion compensating fiber before the light signal is sent to the optical fiber forming the transmission line.

For wavelength multiplex transmission systems to transmit light signals through an optical fiber line by multiplex light signals having different wavelengths, the problem of wavelength dispersion becomes more complicated. That is, the amount of dispersion of the wavelength dispersion increases with increasing differences between the wavelengths of light signals and the zero dispersion wavelength, and wavelength multiplex signals passing through the optical fiber undergo different wavelength dispersions corresponding to the wavelengths of the light signals.

Conventionally, the wavelength dispersion compensation apparatus shown in FIG. 2 has been used. The wavelength dispersion compensation apparatus shown in FIG. 2 is used in a wavelength multiplex transmission system for transmitting a wavelength multiplex signal which composes of light signals with wavelengths from $\lambda 1$ to $\lambda n$. To this wavelength dispersion compensation apparatus, individual light signals before multiplexing with the wavelengths from $\lambda 1$ to $\lambda n$ are admitted.

In this example, the wavelength $\lambda 1$ is closest to the zero dispersion wavelength of the optical fiber used for the wavelength multiplex transmission, and the difference in wavelength from the zero dispersion wavelength increases in the order of $\lambda 2, \lambda 3, \ldots, \lambda n$. Thus, if a wavelength multiplex signal is transmitted without compensation through the transmitting optical fiber, the amount of wavelength dispersion will be smallest for the light signal with the wavelength of $\lambda 1$, and the amount of the wavelength dispersion generated in each light signal increases in the order of $\lambda 2, \lambda 3, \ldots, \lambda n$.

In the wavelength dispersion compensation apparatus, the light signal with a wavelength of $\lambda 1$ is made to pass a single dispersion compensation fiber DCF1, and the light signal with the wavelength of $\lambda 2$ is made to pass two dispersion compensation fibers DCF1, . . . , and the light signal with the wavelength of $\lambda n$ is made to pass n pieces of dispersion compensation fibers. By making each light signal having the wavelength from $\lambda 1$~$\lambda n$ pass through appropriate number of dispersion compensation fibers, each light signal s subjected to wavelength dispersion which is reverse in the direction to that of the transmission, and the absolute value of which is the same as that undergone during transmission.

These light signals with wavelengths from $\lambda 1$ to $\lambda n$, after passing through the dispersion compensation fibers, are amplified by respective light amplifiers AMP1 to AMPn, multiplexed by the arrayed waveguide grating AWG to produce a wavelength multiplex signal, and the multiplex signal is transmitted by the transmission optical fiber.

In the above transmission system, during transmission, the light signals with wavelengths from $\lambda 1$ to $\lambda n$ will experience light dispersions corresponding to the wavelength differences between the wavelength of the light signals and the zero dispersion wavelength. However, as described above, the wavelength dispersions are compensated for in the course of passing through respective dispersion compensation fibers. Therefore, as a result, it becomes possible to transmit a wavelength multiplex signal without experiencing wavelength dispersion.

Since the hereinabove described device for compensating the wavelength dispersion compensates for wavelength dispersion by the use of a number of dispersion compensating fibers for each light signal before the wavelength multiplexing, a large number and a large quantity of dispersion compensating fibers are required, so that the problem arises that a large space is required for accommodating the dispersion compensation fibers. Furthermore, another problem arises that, since the dispersion compensation fibers are expensive, the wavelength dispersion compensation apparatus becomes also expensive.

It is therefore an object of the present invention to provide a wavelength dispersion compensation apparatus for a multiplex wavelength transmission system, which does not need a large number of dispersion compensation fibers and which can be constructed at low cost.

SUMMARY OF THE INVENTION

The wavelength dispersion compensation apparatus of the present invention compensates for wavelength dispersion of a wavelength multiplex signals, when a wavelength multiplex signal is transmitted through an optical fiber of the wavelength multiplex transmission system, wherein said wavelength dispersion compensation apparatus comprises:

a plurality of dispersion compensation fibers for transmitting said wavelength multiple signal or individual light signals which compose said wavelength multiplex signal in sequence and for producing the wavelength dispersion for said individual light signals in order to compensate for the wavelength dispersion which will occur during transmission through the transmission optical fiber;

a plurality of light branching means, disposed at the output ends of each of said plurality of dispersion compensation fibers, for separating and extracting a light signal with a specific wavelength from the light signals forming the wavelength multiplex signal output after passing through said dispersion compensation fibers; and a wavelength multiplexing means for amplifying light signals separated and extracted by said light branching means to a specific level, for generating a wavelength multiplex signal by multiplexing the light signals after amplification, and the wavelength multiplex signal is supplied to the transmission optical fibers.

DESCRIPTION OF THE PREFERRED EMBODIMENTS

Hereinafter, an embodiment of the present invention will be described with reference to the attached drawings.

Figure 1:
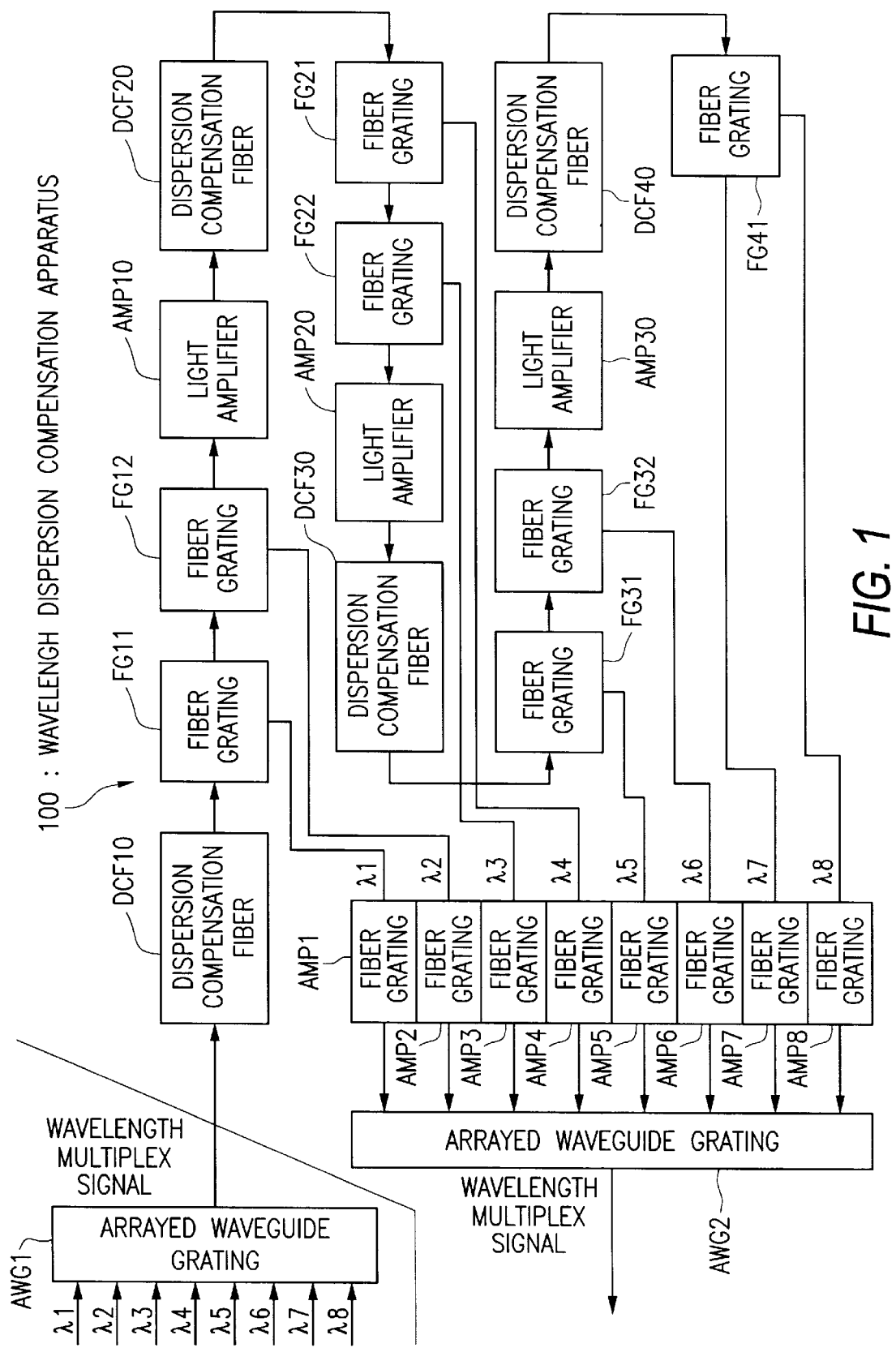
FIG. 1 is a block diagram showing the structure of the wavelength dispersion compensation apparatus according to one embodiment of the present invention.

FIG. 1 is a block diagram showing the structure of the wavelength dispersion compensation apparatus according to an embodiment of the present invention. The conventional wavelength dispersion apparatus described above applies the compensation treatment for compensating the wavelength dispersions which will occur during transmission for respective light signals with wavelengths from $\lambda 1$ to $\lambda n$, and respective light signals after the compensation treatment are multiplexed to supply them to the transmission optical fibers. In contrast, the wavelength dispersion compensation apparatus of the present invention treats the light signal after multiplexing.

Referring to FIG. 1, light signals with wavelengths of $\lambda 1$ to $\lambda 8$ are input into an arrayed waveguide grating AWG1. Those light signals with wavelengths ranging from $\lambda 1$ to $\lambda 8$ are multiplexed by the arrayed waveguide grating AWG1, and the wavelength multiplex signal thus multiplexed is subjected to the compensation treatment by the wavelength dispersion compensation apparatus according to an embodiment of the present invention. Subsequently, the wavelength multiplex signal after the wavelength dispersion compensation treatment is output from the arrayed waveguide grating AWG2, and the wavelength multiplex signal is supplied to the transmission optical fiber (not shown) of the wavelength multiplex transmission system.

The transmission optical fiber possesses a prescribed zero-dispersion wavelength, and assume that the wavelength $\lambda 1$, which is one wavelength of a plurality of light signals composing the wavelength multiplex signal, is the closest to the zero-dispersion wavelength, and the differences of the wavelength from that of the zero-dispersion wavelength increase in the order of $\lambda 1, \lambda 2, \ldots, \lambda n$. Therefore, if the wavelength multiplex signal is transmitted through the transmission optical fiber without compensating the wavelength dispersion, the amount of the wavelength dispersion is the smallest for the light signal with the wavelength of $\lambda 1$, and the amounts of the wavelength dispersions increase in the order of $\lambda 2, \lambda 3, \ldots, \lambda n$. That is, the relationship between the wavelengths of the light signals and the wavelength dispersions is the same as that of the conventional systems as described above.

The wavelength dispersion compensation apparatus according to this embodiment of the present invention comprises four dispersion compensation fibers DCF10, DCF20, DCF30, and DCF40; seven fiber gratings FG11, FG12, FG21, FG22, FG31, FG32, and FG41; and three light amplifiers AMP10, AMP20, and AMP30.

Although the wavelength multiplex signal obtained from the arrayed wave guide grating AWG1 is composed of eight light signals with wavelength from $\lambda 1$ to $\lambda 8$, as mentioned above, the travel directions of the respective light signals are divided, and each light signal propagates through a different path.

That is, the light signals with wavelengths of $\lambda 1$ and $\lambda 2$ pass through the dispersion compensation fiber DCF 10, and the light signal of $\lambda 1$ is sent to the light amplifier AMP1 by the fiber gating FG11, and the light signal of $\lambda 2$ is sent to the light amplifier AMP2 by the fiber grating FG12.

The light signals with wavelengths of $\lambda 3$ and $\lambda 4$ then pass through the dispersion compensation fibers DCF10 and DCF20, and the light signal of $\lambda 3$ is sent to the light amplifier AMP3 by fiber grating FG21, and the light signal of $\lambda 4$ is sent to the light amplifier AMP4 by the fiber grating FGG 22.

The light signals with wavelengths of $\lambda 5$ and $\lambda 6$ then pass through the dispersion compensation fibers DCF10, DCF 20, and DCF30, and the light signal of $\lambda 5$ is then introduced to the light amplifier AMP5 by the fiber grating 31, and the light signal of $\lambda 6$ is introduced to the light amplifier AMP6 by the fiber grating FG32.

Furthermore, the light signals with wavelengths of $\lambda 7$ and $\lambda 8$ then pass through the dispersion compensation fibers DCF10, DCF20, DCF30, and DCF40, and the light signal of $\lambda 7$ is then introduced to the light amplifier AMP7 by the fiber grating FG41 and the light signal of $\lambda 8$ is introduced to the light amplifier AMP8.

As described above, although the light signals which composes the wavelength multiplex signal are lead to pass through the dispersion compensation fibers in sequence, at the output end of each dispersion compensation fiber, two light signals with mutually close wavelengths are separated from the wavelength multiplex signal by two fiber gratings and they are branched and lead to respective light amplifiers. That is, two fiber gratings disposed at the output end of the dispersion compensation fiber correspond to the "light branching means" described in the scope of claims of the present invention.

The light amplifiers AMP 10, AMP 20, and AMP 30 are means for compensating for the attenuation of the wavelength multiplex signal caused during the transmission through dispersion compensation fibers and fiber-gratings.

Next, the dispersion compensation fibers DCF 10 to DCF 40 will be described. These dispersion compensation fibers constitutes a means for providing a wavelength dispersion in advance for compensating for the wavelength dispersion which will be generated during the transmission of the light signal through the transmission optical fibers.

In more detail, when light signals with a series of wavelengths from $\lambda 1$ to $\lambda 8$ are transmitted through the dispersion compensation fibers DCF 10 to DCF40, these dispersion compensation fibers DCF 10 to DCF40 have a property to provide the same amounts of the wavelength dispersions in the opposite direction, as that which will be generated during the transmission of light signals supposing when the light signals with a series of wavelengths from $\lambda 1$ to $\lambda 8$ are transmitted through the transmission optical fibers.

Regarding the length of the dispersion compensation fibers DCF10, DCF20, DCF30, and DCF40, the length of the dispersion compensation fiber DCF10 is chosen such that the absolute value of the wavelength dispersion generated in two light signals with wavelengths of $\lambda 1$ and $\lambda 2$ when they are transmitted through said dispersion compensation fibers are the same as the absolute value of the wavelength dispersion generated when the same light signals with the same wavelengths of $\lambda 1$ and $\lambda 2$ are transmitted through the transmission optical fibers.

The total length of two dispersion compensation fibers DCF10 and DCF20 is chosen such that the absolute values of the wavelength dispersions generated in each light signal with wavelengths of $\lambda 3$ and $\lambda 4$ when they are transmitted through the dispersion compensation fibers are the same as the absolute values of the wavelength dispersions generated when the same light signals with the same wavelengths of $\lambda 3$ and $\lambda 4$ are transmitted through the transmission optical fibers.

Further, the total length of the dispersion compensation fibers DCF10, DCF20, and DCF30 is decided such that the absolute values of the wavelength dispersions generated in two light signals with wavelengths of $\lambda 5$ and $\lambda 6$ when transmitted through the dispersion compensation fibers are the same as the absolute values of the wavelength dispersions generated when the same light signals with the same wavelengths of $\lambda 5$ and $\lambda 6$ are transmitted through the transmission optical fibers.

Furthermore, the total length of the dispersion compensation fibers DCF10, DCF20, DCF30, and DCF40 is decided such that the absolute values of the wavelength dispersions generated in two light signals with wavelengths of $\lambda 7$ and $\lambda 8$ when they are transmitted through the dispersion compensation fibers are the same as the absolute values of the wavelength dispersions generated when the same light signals with the wavelength of $\lambda 5$ and $\lambda 6$ are transmitted through the transmission optical fibers.

The light amplifiers AMP1 to AMP8 are means to amplify the light signals with the wavelengths of $\lambda 1$ to $\lambda 8$ collected by each fiber grating. The arrayed waveguide AWG2 is a means to multiplex respective light signals output from the light amplifiers AMP1 to AMP8 and a means to supply the multiplexed light signal to the transmission optical fiber. These light amplifiers AMP1 to AMP8 and the arrayed waveguide AWD2 correspond to the "wavelength multiplying means" in the scope of the claims of the present invention.

The practical operation of this embodiment of the present invention will be described hereinafter. In the embodiment of the present invention, the wavelength multiplex signal is composed of light signals with wavelengths from $\lambda 1$ to $\lambda 8$. It is assumed that the light signals with wavelengths of $\lambda 1$ and $\lambda 2$ require a dispersion compensation of 750 ps/nm, the light signals with wavelengths of $\lambda 3$ and $\lambda 4$ require a dispersion compensation of 1500 ps/nm, the light signals with wavelengths of $\lambda 5$ and $\lambda 6$ require a dispersion compensation of 2250 ps/nm, and the light signals with wavelengths of $\lambda 7$ and $\lambda 8$ require a dispersion compensation of 3,000 ps/nm. In the present embodiment, it is also assumed that the amount of dispersion of each compensation fiber is 750 ps/nm. Hereinafter, the operation of the wavelength dispersion compensation apparatus will be described under the conditions mentioned above.

In FIG. 1, the light signals with the wavelengths ranging from $\lambda 1$ to $\lambda 8$ are multiplexed by the arrayed waveguide AWG1. The thus obtained wavelength multiplex signal is input into the dispersion compensation fiber DCF10 and, after being subjected to a dispersion compensation by 750 ps/nm, the wavelength multiplex signal is input into the fiber grating FG11.

At the fiber grating FG11, a light signal with a wavelength of $\lambda 1$ is separated from the wavelength multiplex signal and is supplied to the light amplifier AMP1. In contrast, the wavelength multiplex signal from which the light signal with the wavelength $\lambda 1$ was subtracted, that is, the wavelength multiplex light signals from $\lambda 2$ to $\lambda 8$, is supplied to the fiber grating FG12 from the fiber grating FG11.

Subsequently, at the fiber grating FG12, a light signal with a wavelength of $\lambda 2$ is separated from the wavelength multiplex signal, and is supplied to the light amplifier AMP2. In contrast, the wavelength multiplex signal, from which the light signal with a wavelength of $\lambda 2$ is subtracted, that is the multiplex signals from $\lambda 3$ to $\lambda 8$, is supplied to the light amplifier AMP10 from the fiber grating FG12.

Next, at the light amplifier AMP10, the wavelength multiplex signal composed of signals with wavelengths from $\lambda 3$ to $\lambda 8$, which were attenuated by passing through the dispersion compensation fiber DCF10 and the fiber rating FG11 and FG12, is amplified and then supplied to the dispersion compensation fiber DCF20.

Furthermore, at the dispersion compensation amplifier DCF20, the wavelength multiplex signal composed of signals with wavelengths from $\lambda 3$ to $\lambda 8$ is further subjected to the dispersion compensation of 750 ps/nm and the wavelength multiplex signal after dispersion compensation is supplied to the fiber grating FG21. Thus, the amount of dispersion given to the wavelength multiplex signal composed of wavelengths from $\lambda 3$ to $\lambda 8$ becomes 1500 ps/nm.

Furthermore, the light signal with a wavelength of $\lambda 3$ in the wavelength multiplex signal is separated out at the fiber grating FG22, and is sent to the light amplifier AMP4, and the wavelength multiplex signals with the wavelengths from $\lambda 4$ to $\lambda 8$ is supplied to the fiber grating FG22.

Next, the light signal with the wavelength of $\lambda 4$ is extracted out of multiplex signal composed of wavelengths of $\lambda 4$ to $\lambda 8$, and the light signal with a wavelength of $\lambda 4$ is sent to the light amplifier AMP4, and the remaining multiplex signal composed wavelengths from $\lambda 5$ to $\lambda 8$ is supplied to light amplifier AMP 20.

The wavelength multiplex signal with the wavelengths of $\lambda 5$ to $\lambda 8$ is amplified at the light amplifier AMP20, and then supplied to the dispersion compensation fiber DCF30.

At this dispersion compensation fiber DCF30, the wavelength multiplex signal composed of wavelengths from $\lambda 5$ to $\lambda 8$ is subjected to a further dispersion compensation of 750 ps/nm, and is supplied to the fiber grating FG31. The total amount of dispersion compensation given to the light signals with the wavelengths from $\lambda 5$ to $\lambda 8$ is 2250 ps/nm.

The light signal with the wavelength of $\lambda 5$ in the multiplex signal composed of the wavelengths of $\lambda 5$ to $\lambda 8$ is sent to the light amplifier AMP5, and the remaining multiplex signal composed of the wavelengths from $\lambda 6$ to $\lambda 8$ is supplied to the fiber grating FG32.

The light signal with the wavelength of $\lambda 6$ is separated from the multiplex signals of the wavelength from $\lambda 6$ to $\lambda 8$ and sent to the light amplifier AMP6, and the remaining multiplex signal composed of light signals with the wavelength from $\lambda 7$ and $\lambda 8$ is supplied to the light amplifier AMP30.

The light signals with the wavelengths $\lambda 7$ and $\lambda 8$ are amplified at the light amplifier AMP30 and supplied to the dispersion compensation fiber DCF40.

In the dispersion compensation fiber DCF40, the light signals with wavelengths λ7 and λ87 is subjected to a dispersion compensation of 750 ps/nm, and both light signals are then sent to the fiber grating FG41. The total amount of dispersion compensation given to the light signals of λ7 and λ8 is 3,000 ps/nm.

The light signal with a wavelength of λ7 is then separated at the fiber grating FG41 and is sent to the light amplifier AMP7, and the remaining light signal with a wavelength of λ8 is supplied to the light amplifier AMP8.

The light amplifiers AMP1 to AMP8 adjust the levels of the respective light signals such that the outputs of the respective signals becomes identical when respective light signals are multiplexed at the arrayed waveguide grating AWG 2. After levels of the light signals are adjusted, these light signals are multiplexed by the arrayed waveguide grating AWG2 into a wavelength multiplex signal, which is then supplied to the transmission optical fiber in the wavelength multiplex transmission system.

Figure 2:
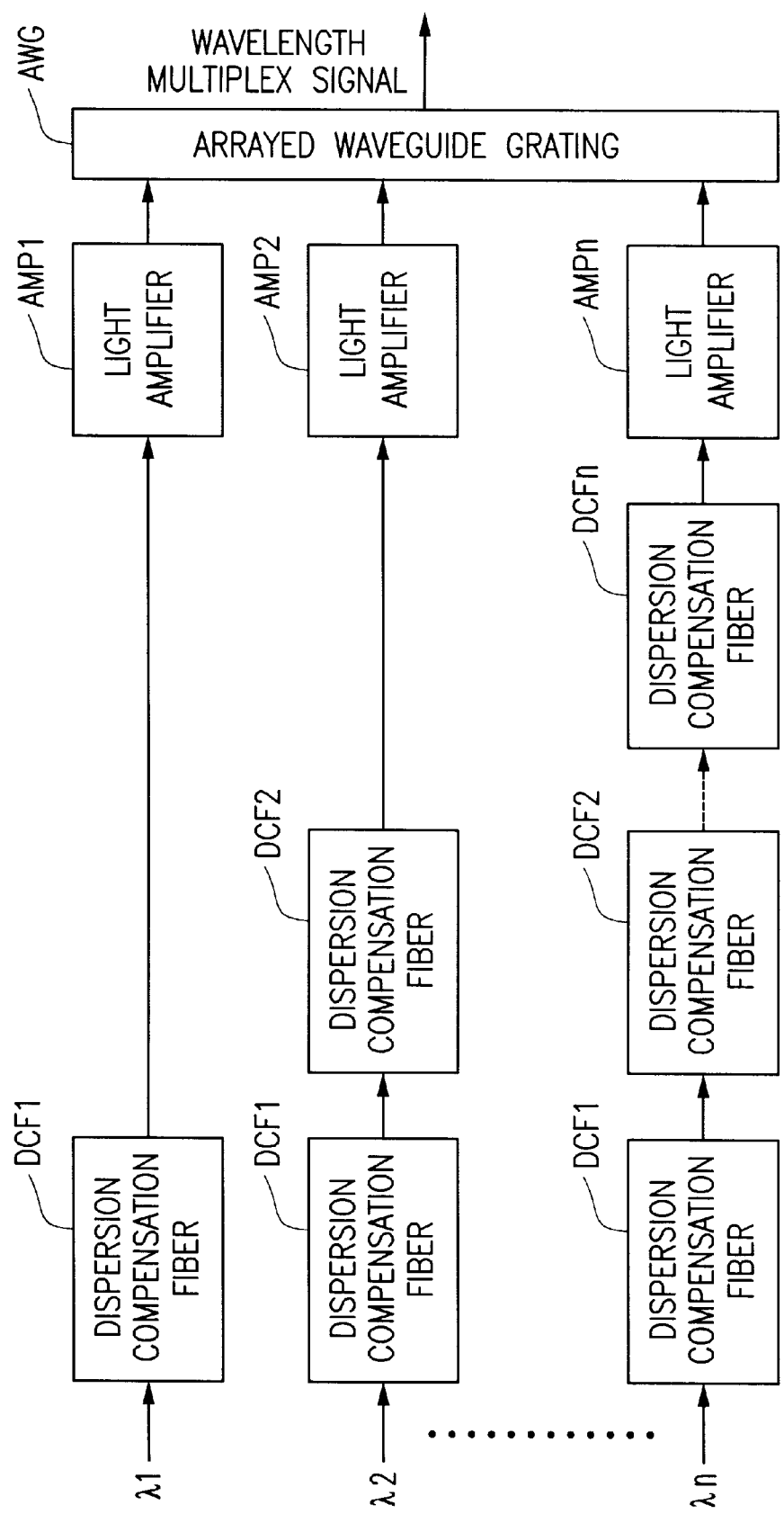
FIG. 2 is a block diagram showing the structure of a conventional wavelength dispersion compensation apparatus.

Hereinafter, the effect of the present embodiment will be described in comparison with the conventional technique. If the conventional dispersion compensation apparatus (FIG. 2) is constructed under the same conditions as those described in the operations of the present embodiment, the amount of dispersion compensation for each wavelength is as listed below.

λ1: 750 ps/nm,
λ2: 750 ps/nm
λ3: 1500 ps/nm
λ4: 1500 ps/nm
λ5: 2250 ps/nm
λ6: 2250 ps/nm
λ7: 3000 ps/nm
λ8: 3000 ps/nm

Thus, the dispersion compensation fibers corresponding to 15,000 ps/nm are necessary to construct the conventional dispersion compensation apparatus.

In contrast, the present dispersion compensation apparatus according to the present embodiment can be constructed by the use of dispersion compensation fibers corresponding to 3,000 ps/nm. Accordingly, the total length of the dispersion compensation fibers for the present embodiment can be greatly reduced compared to that required for the conventional apparatus. In addition, since the present dispersion compensation apparatus is designed such that the same amount of dispersion compensation are given to light signals with close wavelengths (for example, λ1 and λ2) by the common dispersion compensation fiber (for example, DCF10), a smaller number of dispersion compensation fibers than the number of light signals composing the wavelength multiplex signal is required for this dispersion compensation apparatus.

As hereinabove described, the present invention is described with reference to one embodiment of the present invention. However, it should be understood that the present invention is not limited to that embodiment, and various modifications may be applied. For example, the arrayed waveguide gratings AWG1 and AWG2 shown in FIG. 1 may be replaced with light couplers. In addition, the fiber grating in FIG. 1 may be replaced with a light coupler and a light filter. Furthermore, each of the light amplifiers is not necessarily disposed as shown in FIG. 1, since the locations of these light amplifiers is decided by the attenuation of the light signals.

As described above, the wavelength dispersion compensation apparatus of the present invention can be constructed at low cost, since it requires only a small number and small total quantity of the dispersion compensation fibers.

What is claimed is:

1. A wavelength dispersion compensation apparatus for use in a wavelength multiplex transmission system, the apparatus compensating, in advance, for a wavelength dispersion induced in respective wavelengths of a wavelength multiplexed signal during transmission through a transmission optical fiber, the wavelength dispersion compensation apparatus comprising:

a plurality of dispersion compensation fibers coupled in series, said plurality of dispersion compensation fibers applying respective compensating wavelength dispersions to said respective wavelengths of said wavelength multiplexed signal in order to compensate for the wavelength dispersion that will occur during transmission in the transmission optical fiber;

a plurality of light branching devices, at least one of said light branching devices being disposed at an output end of each of said dispersion compensation fibers, said light branching devices separating and extracting individual light signals with specific wavelengths from said wavelength multiplexed signal; and a light multiplexer coupled to said plurality of light branching devices, said light multiplexer generating a compensated wavelength multiplexed signal by multiplexing said individual light signals, said light multiplexer further supplying said compensated wavelength multiplexed signal to the transmission optical fiber.

2. The wavelength dispersion compensation apparatus according to claim 1, further comprising a plurality of light amplifiers, at least one of said plurality of light amplifiers being disposed between each of said dispersion compensation fibers.

3. The wavelength dispersion compensation apparatus according to claim 1, wherein each of said plurality of light branching devices separates two light signals with mutually close wavelengths in light signals constituting the wavelength multiplexed signal.

4. The wavelength dispersion compensation apparatus according to claim 1, further comprising a plurality of light amplifiers coupled to said light multiplexer, said plurality of light amplifiers amplifying said individual light signals.

5. The wavelength dispersion compensation apparatus according to claim 1, wherein said light branching devices are fiber gratings.

* * * * *